(12) United States Patent
Pierce et al.

(10) Patent No.: US 12,714,260 B2
(45) Date of Patent: Aug. 25, 2026

(54) SYSTEMS FOR LOCATING THE BASE OF A STAND MIXER

(71) Applicant: Haier US Appliance Solutions, Inc., Wilmington, DE (US)

(72) Inventors: Andrew Pierce, Louisville, KY (US); Eric Matthew Lewis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 982 days.

(21) Appl. No.: 17/879,202

(22) Filed: Aug. 2, 2022

(65) Prior Publication Data

US 2024/0041259 A1 Feb. 8, 2024

(51) Int. Cl.
*A47J 43/044* (2006.01)
*A47J 43/07* (2006.01)

(52) U.S. Cl.
CPC ............ *A47J 43/044* (2013.01); *A47J 43/07* (2013.01); *A47J 2043/04454* (2013.01)

(58) Field of Classification Search
CPC ...... A47J 43/044; A47J 43/0705; A47J 43/07; A47J 2043/04454; B01F 33/5012; B01F 33/5014
See application file for complete search history.

(56) References Cited

U.S. PATENT DOCUMENTS

| | | | | |
|---|---|---|---|---|
| 1,067,845 A * | 7/1913 | Shattuck | A47J 43/044 | 366/207 |
| 1,592,550 A * | 7/1926 | Webb | A47J 43/044 | 366/198 |
| 2,643,864 A * | 6/1953 | Graham | A47J 43/044 | 74/533 |
| 2,789,798 A * | 4/1957 | Brace | A47J 43/044 | 310/91 |
| 3,269,678 A * | 8/1966 | Jepson | A47J 43/07 | 248/664 |
| 4,351,612 A | 9/1982 | Valbona et al. | | |
| 8,066,426 B2 * | 11/2011 | Sandford | A47J 43/046 | 366/205 |
| 10,092,139 B2 | 10/2018 | Barfus et al. | | |
| 10,575,683 B2 | 3/2020 | Nernberger et al. | | |

FOREIGN PATENT DOCUMENTS

| | | |
|---|---|---|
| EP | 2666397 B1 | 6/2016 |
| GB | 687323 A * | 2/1953 |
| KR | 102112463 B1 | 5/2020 |

* cited by examiner

*Primary Examiner* — Marc C Howell
(74) *Attorney, Agent, or Firm* — Dority & Manning, P.A.

(57) ABSTRACT

A stand mixer appliance includes a casing that includes a second base portion, a main body mounted to the second base portion, and a motor housing mounted to the main body, extending outwardly above the second base portion. The main body includes a column portion and a first base portion. The second base portion includes an aperture, and the first base portion of the main body includes a pin configured to engage with the aperture of the second base portion.

19 Claims, 3 Drawing Sheets

L
T
104
400
402
202
304
302
306
410

SYSTEMS FOR LOCATING THE BASE OF A STAND MIXER

FIELD OF THE INVENTION

The present subject matter relates generally to systems and method of locating the base of a stand mixer to other components during assembly.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like.

During manufacturing of certain stand mixers, the base of the stand mixer appliance is fixed to the main body by a pattern of fasteners. Using the pattern of fasteners can require an operator to loosen all the fasteners, then partially start all of them before doing the final fastening operation in order to avoid interference between the fasteners. In current practice, the locating of the base to the main body is set by the pattern of fasteners using external fixturing, which is difficult and costly for manufacturing.

BRIEF DESCRIPTION OF THE INVENTION

Aspects and advantages of the invention will be set forth in part in the following description, or may be apparent from the description, or may be learned through practice of the invention.

In one example embodiment, a stand mixer appliance includes a casing that includes a base, a main body mounted to the base, and a motor housing mounted to the main body, extending outwardly above the base. The base includes an aperture, and the main body includes a pin configured to engage with the aperture of the base.

In another example embodiment, a stand mixer appliance includes a casing that includes a second base portion, a main body mounted to the second base portion, and a motor housing mounted to the main body, extending outwardly above the second base portion. The main body includes a column portion and a first base portion. The second base portion includes an aperture, and the first base portion of the main body includes a pin configured to engage with the aperture of the second base portion.

In another example embodiment, a stand mixer appliance includes a casing that includes a second base portion, a main body mounted to the second base portion, and a motor housing mounted to the main body, extending outwardly above the second base portion. The stand mixer appliance also includes a plurality of clearance holes on the second base portion. The main body includes a column portion and a first base portion. The first base portion includes a plurality of fastener holes. The second base portion includes an aperture, and the first base portion of the main body includes a pin configured to engage with the aperture of the second base portion. The pin of the first base portion engages with the aperture of the second base portion to align the plurality of clearance holes with the plurality of fastener holes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
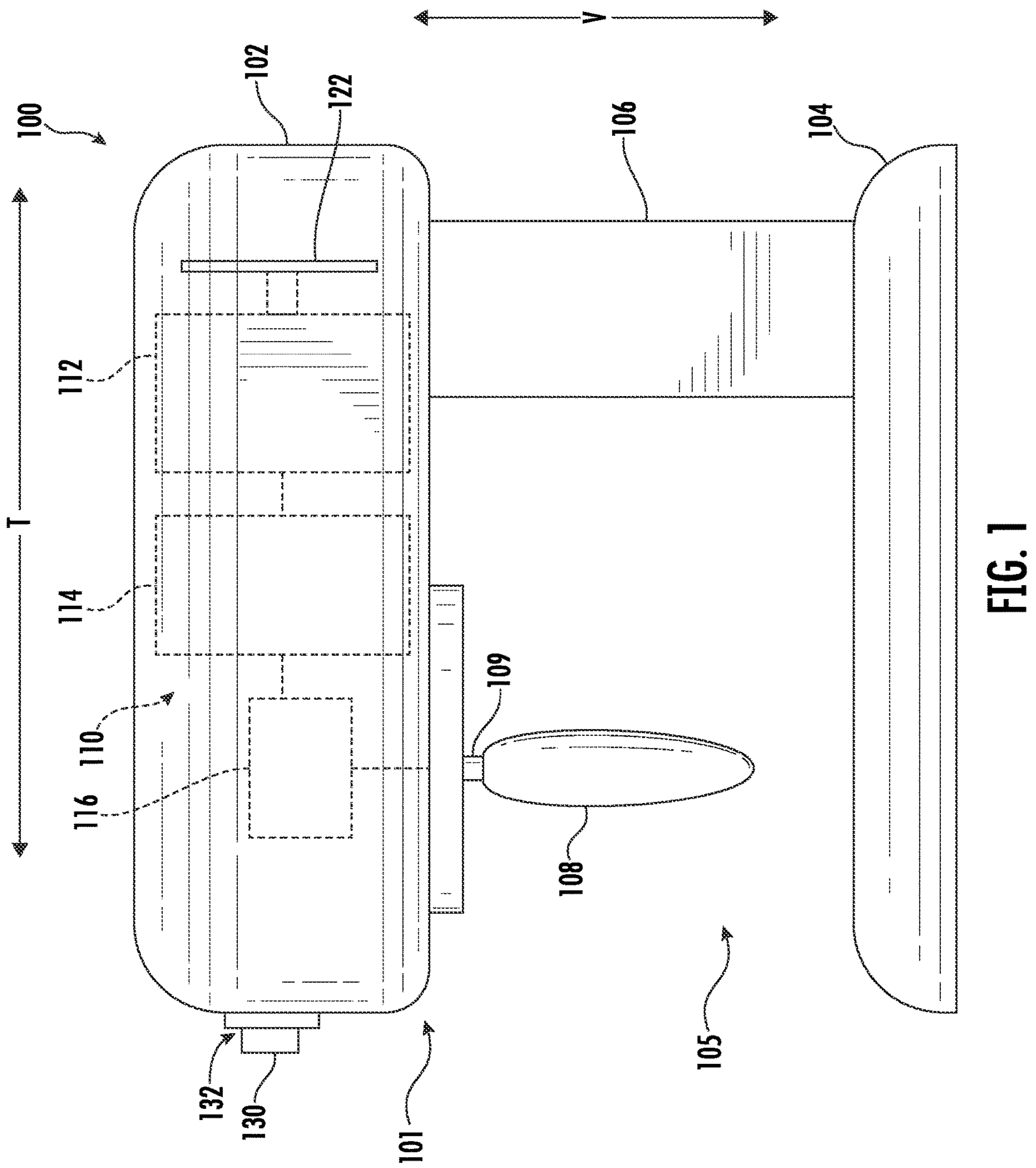
FIG. 1 provides a side section view of a stand mixer according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments. Moreover, stand mixer 100 of FIG. 1 may define a vertical direction V and a transverse direction T, which are mutually perpendicular to one another. It should be understood that these directions are presented for example purposes only, and that relative positions and locations of certain aspects of stand mixer 100 may vary according to specific embodiments, spatial placement, or the like.

Stand mixer 100 may include a casing 101. Casing 101 may include a motor housing 102, a base 104, and a column 106. Motor housing 102 may house various mechanical and/or electrical components of stand mixer 100, which will be described in further detail below. For example, as shown in FIG. 1, a motor 112, a reduction gearbox 114, and a bevel gearbox 116 may be disposed within motor housing 102. Base 104 may support motor housing 102. For example, motor housing 102 may be mounted (e.g., pivotally) to base 104 via column 106, e.g., that extends upwardly (e.g., along the vertical direction V) from base 104. Motor housing 102 may be suspended over a mixing zone 105, within which a mixing bowl may be disposed and/or mounted to base 104.

A drivetrain 110 may be provided within motor housing 102 and is configured for coupling motor 112 to a shaft 109 (e.g., a mixer shaft), such that shaft 109 is rotatable via motor 112 through drivetrain 110. Drivetrain 110 may include gearbox 114, bevel gearbox 116, etc. An opening 132 for a horizontal accessory shaft 130 may align with the rotational axis of motor 112. Mixer shaft 109 may be positioned above mixing zone 105 on motor housing 102, and an attachment 108, such as a beater, whisk, or hook, may be removably mounted to mixer shaft 109. Attachment 108 may rotate within a bowl (not shown) in mixing zone 105 to beat, whisk, knead, etc. material within the bowl during operation of motor 112.

As noted above, motor 112 may be operable to rotate mixer shaft 109. Motor 112 may be a direct current (DC) motor in certain example embodiments. In alternative example embodiments, motor 112 may be an alternating current (AC) motor. Motor 112 may include a rotor and a stator. The stator may be mounted within motor housing 102 such that the stator is fixed relative to motor housing 102, and the rotor may be coupled to mixer shaft 109 via drivetrain 110. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Stand mixer 100 may include a controller 122 provided within casing 101. For example, controller 122 may be located within motor housing 102 of casing 101. Controller 122 may be a microcontroller, as would be understood, including one or more processing devices, memory devices, or controllers. Controller 122 may include a plurality of electrical components configured to permit operation of stand mixer 100 and various components therein (e.g., motor 112). For instance, controller 122 may be a printable circuit board (PCB), as would be well known.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 122 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 122 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Figure 2:
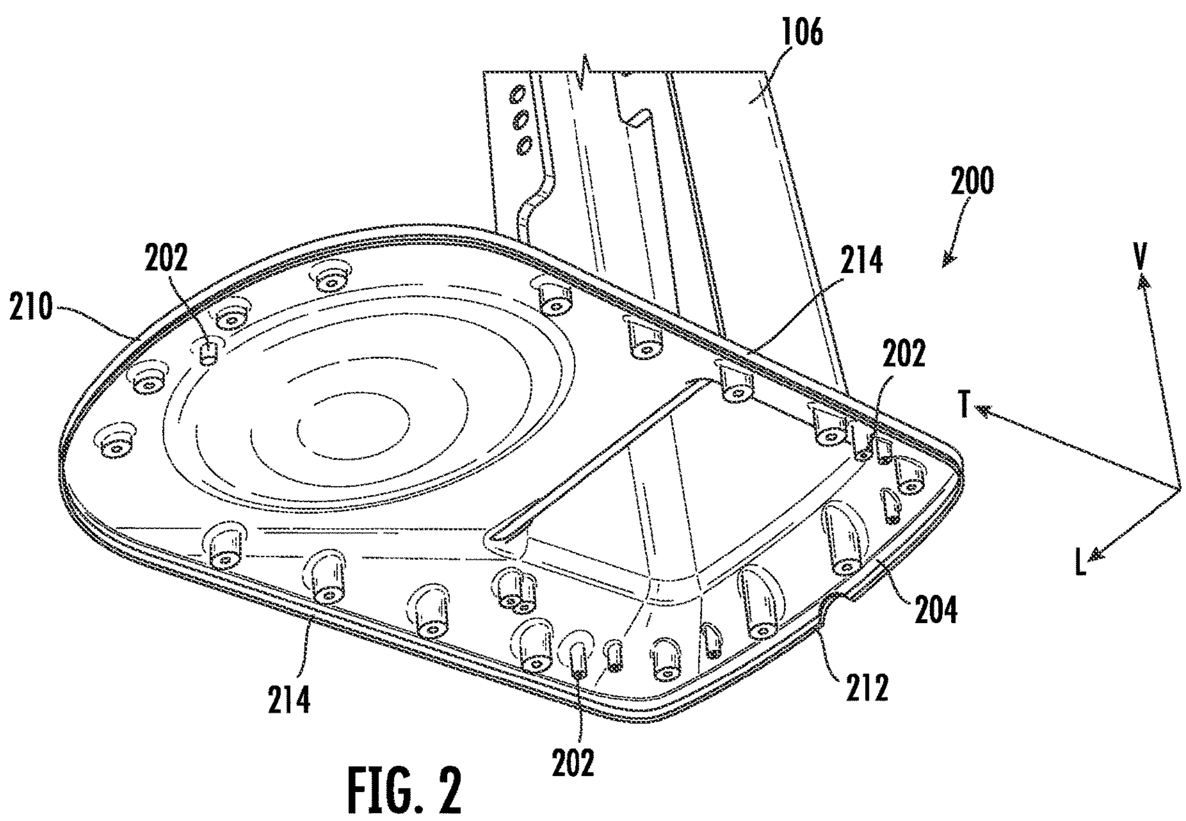
FIG. 2 provides a perspective view of a main body of the example stand mixer of FIG. 1.

As shown in FIG. 2, stand mixer 100 may include a main body 200 which includes column 106 and a first base portion 204. First base portion 204 may be defined between a first base front portion 210, a first base back portion 212 (e.g., spaced apart from first base front portion 210 along the transverse direction T), and a pair of first base side portion 214 (e.g., spaced apart along the lateral direction L). For ease of manufacturing and assembly, column 106 and first base portion 204 may be formed as a single, unitary piece of material. For example, column 106 and first base portion 204 may be cast as a single piece of material, such as aluminum or steel alloy.

First base portion 204 may include at least one pin 202, e.g., that extends downwardly along the vertical direction V from a bottom of first base portion 204. Additionally or alternatively, first base portion 204 may include a plurality of pins 202. For example, in the present example embodiment, first base portion 204 is shown in FIG. 2 with three (3) pins 202. Pins 202 may be spaced transversely, in the transverse direction T and laterally in the lateral direction L on first base portion 204. For example, one pin 202 may be positioned approximately centered with respect to the lateral direction L on first base portion 204 and proximate first base front portion 210 in the transverse direction T. The other two (2) pins 202 may be positioned proximate a first base back portion 212 in the transverse direction T. With respect to the lateral direction L, the two (2) pins 202 proximate first base back portion 212 may also be proximate a respective one of first base side portions 214, e.g., such that each pin is positioned proximate an opposing side to the other. In certain example embodiments, the pin 202 locations may generally be positioned in the shape of an isosceles triangle.

Figure 3:
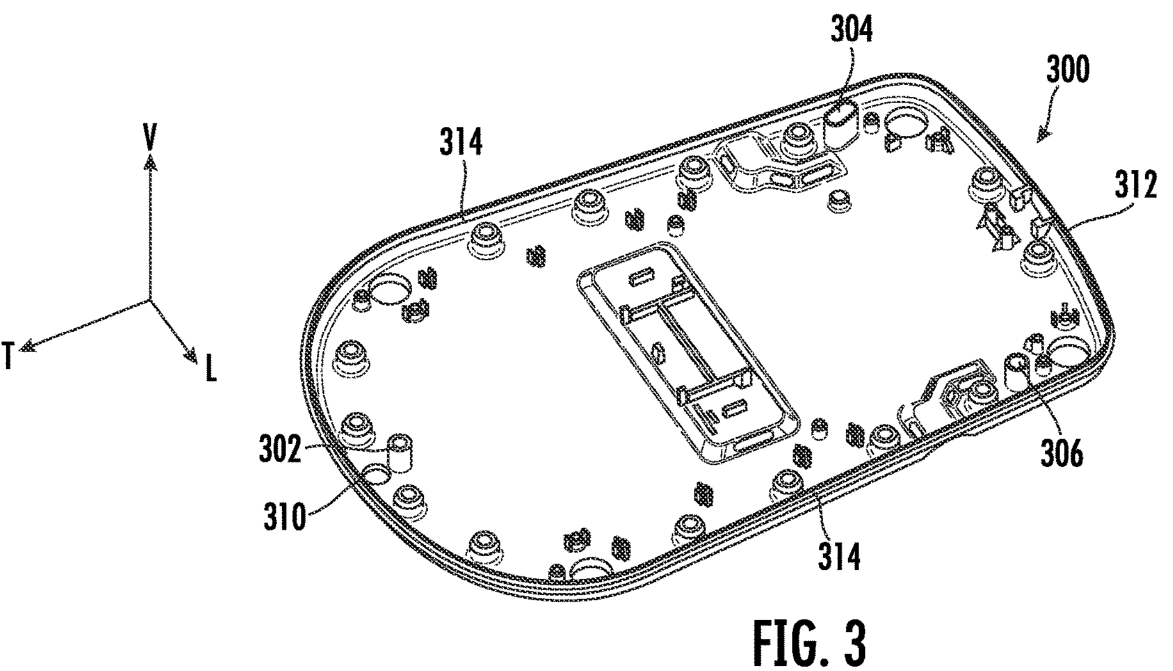
FIG. 3 provides a perspective view of a base portion of the example stand mixer of FIG. 1.

As shown in FIG. 3, second base portion 300 may be defined between a second base front portion 310, a second base back portion 312 (e.g., spaced apart from second base front portion 310 along the transverse direction T), and a pair of second base side portion 314 (e.g., spaced apart along the lateral direction L). Second base portion 300 may include at least one aperture 302, e.g., that is open along the vertical direction V from a top of second base portion 300. Additionally or alternatively, second base portion 300 may include a plurality of apertures, such as apertures 302, 304, and 306. In the present example embodiment, second base portion 300 is shown in FIG. 3 with three (3) apertures, 302, 304, and 306. Apertures 302, 304, and 306 may be spaced transversely, in the transverse direction T and laterally in the lateral direction L on second base portion 300. The locations of apertures 302, 304, and 306 may complement the locations of pins 202 on first base portion 204. For example, one aperture 302 may be positioned approximately centered with respect to the lateral direction L on second base portion 300 and proximate second base front portion 310 in the transverse direction T. The other two (2) apertures 304, 306 may be positioned proximate second base back portion 312 in the transverse direction T. With respect to the lateral direction L, the two (2) apertures 304, 306 proximate second base back portion 312 may also be proximate a respective one of second base side portion 314, e.g., such that each aperture 304, 306 is positioned proximate an opposing side relative to the other. In certain example embodiments, the aperture 302, 304, and 306 locations may generally be positioned in the shape of an isosceles triangle. One of common skill in the art will appreciate that the locations of pins 202 and apertures 302, 304, and 306 described above are provided by way of example only and that pins 202 and apertures 302, 304, and 306 may be positioned in any suitable location on first base portion 204 and second base portion 300, respectively.

Figure 4:
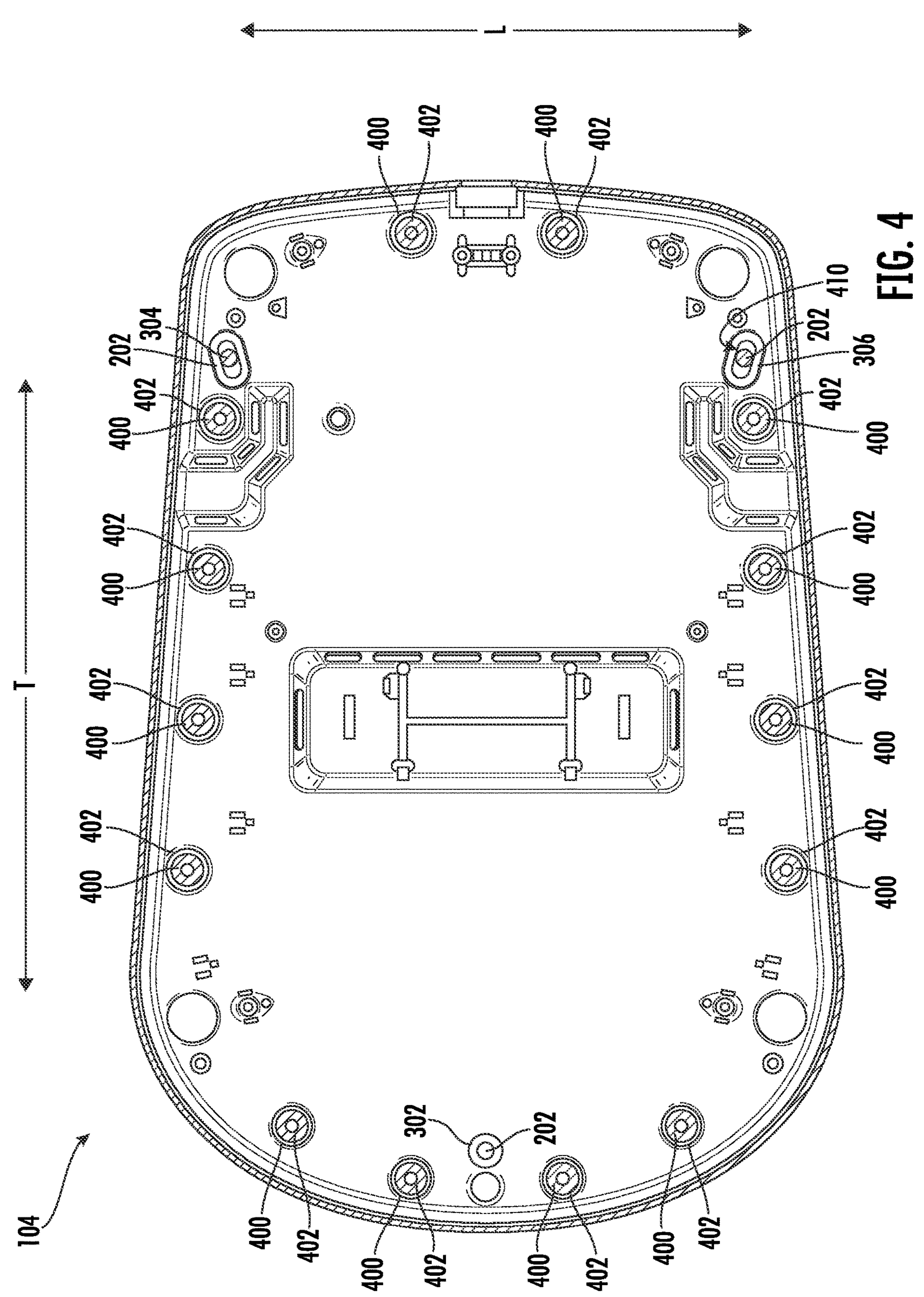
FIG. 4 provides a cross-section view at the mating height of the base assembly of the stand mixer of FIG. 1.

FIG. 4 illustrates a cross-section view at the mating height of the base assembly 104. As shown, each of pins 202 of first base portion 204 may be inserted into a respective one of apertures 302, 304, and 306 in order to couple first base portion 204 to second base portion 300, thus forming base assembly 104. In some example embodiments, at least one aperture 302, 304, and 306 may be slot shaped. For example, aperture 304 is shown in the present example embodiment in FIG. 4 as a slot, e.g., such that aperture 304 is elongated in one or more of the lateral direction L and the transverse direction T. Additionally, also shown in FIG. 4 is aperture 306 which may be a clearance aperture to aid the assembly of base assembly 104 without over constraining with respect to pins 202. Aperture 306 may have a gap 410 between aperture 306 and pin 202 while assembled, e.g., to limit or prevent binding between the wall of aperture 306 and pin 202.

Referring still to FIG. 4, second base portion 300 of stand mixer 100 may include a plurality of clearance holes 402 for mounting second base portion 300 to first base portion 204, and first base portion 204 may include a plurality of fastener holes 400. In a conventional stand mixer, base assembly 104 is affixed using a pattern of fasteners, such as bolts or screws, and due to the size of some stand mixers, a large quantity of fasteners may be required to attain a clamping force sufficient to maintain a tight fit. If the fasteners alone were used to locate first base portion 204 to second base portion 300, the fastener that is driven first may set the location of the second base portion, and the fastener that is driven second may determine the rotation. Locating first base portion 204 to second base portion 300 via the fasteners may cause problems for an operator when attempting to fasten the additional fasteners in the large pattern as the two parts may not be properly aligned, and, further, may exhibit interference between the plurality of clearance holes 402 and the plurality of fastener holes 400. The interference may be due to the large variation in assembly from using the fasteners to locate the plurality of clearance holes 402 to the plurality of fastening holes 400. Typically, external fixturing may be used to aid in the assembly of the stand mixer base, however the fixturing is costly and may be difficult for the operator to use.

In the present example embodiment, pins 202 and apertures 302, 304, and 306 may align the plurality of clearance holes 402 and the plurality of fastener holes 400. When pin 202 engages with aperture 302, translation in a horizontal plane (e.g., perpendicular to the vertical direction V) may be restrained. Then, another pin 202 may engage an aperture, such as aperture 304 (the slot-like aperture) which restrains rotation in the horizontal plane. Further, the remaining pin 202 may engage aperture 306 with clearance to aid in the assembly of base assembly 104, without over constraining first base portion 204 and second base portion 300. As such, the pins 202 and apertures 302, 304, 206 act as four-way (4-way) and two-way (2-way) locators, e.g., the four-way (4-way) locators preventing rotation and translation and two-way (2-way) locators preventing rotation. Thus, locating first base portion 204 to second base portion 300 with pins 202 engaging apertures 302, 304, and 306 may remove the need for external fixturing in order to properly align second base portion 300 to first base portion 204.

As may be seen from the above, the use of locating features, such as pins 202 and apertures 302, 304, and 306, may permit tighter dimensional control and may ensure that the second base portion 300 and first base portion 204 couple together in the same location each time regardless of the drive order of the fasteners. Further, in addition to the resulting ease of assembly, in response to the base and main body being positively located each time, further results may be improved craftsmanship and reduced assembly problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer appliance, comprising:

a casing that comprises a base, a main body mounted to the base, and a motor housing mounted to the main body and extending outwardly above the base, wherein the base comprises:

a first base portion extending outwardly away from the main body, the first base portion formed integrally with the main body, the first base portion comprising a first pin and a second pin extending downwards away from the main body; and a second base portion coupled to the first base portion, the second base portion comprises a first aperture and a second aperture, wherein the first aperture is positioned to receive the first pin and the second aperture is positioned to receive the second pin during assembly of the first base portion to the second base portion.

2. The stand mixer of claim 1, wherein at least one of the first aperture and the second aperture is a slot configured to restrain rotation of the first base portion and the main body relative to the base in a horizontal plane.

3. The stand mixer of claim 1, wherein at least one of the first pin and the second pin of the first base portion engaging in the respective first aperture or the second aperture of the second base portion restrains rotation and translation of the first base portion and the main body relative to the second base portion in a horizontal plane.

4. The stand mixer of claim 1, further comprising a plurality of clearance holes on the second base portion and a plurality of fastener holes in the first base portion, the plurality of clearance holes pairing with the plurality of fastener holes.

5. The stand mixer of claim 4, wherein the first pin and the second pin of the first base portion engaging with the respective first aperture or the second aperture of the second base portion aligns the plurality of clearance holes with the plurality of fastener holes.

6. The stand mixer of claim 1, wherein the first pin is positioned proximate a first base front portion and the second pin is positioned proximate a first base back portion.

7. The stand mixer of claim 6, further comprising a third pin extending from the first base portion and the second base portion comprises a third aperture, wherein both of the second pin and the third pin are positioned proximate the first base back portion and are spaced across opposing sides of the first base portion with respect to a pair of first base side portions.

8. The stand mixer of claim 7, wherein the third aperture comprises a clearance slot, wherein the third pin engaging within the third aperture defines a gap between the third aperture and the third pin while assembled.

9. A stand mixer appliance, comprising:

a casing that comprises a base, a main body mounted to the base, and a motor housing mounted to the main body and extending outwardly above the base, wherein the main body comprises a column portion, wherein the base comprises:

a first base portion extending outwardly away from the column portion, the first base portion formed integrally with the main body, the first base portion comprising a first pin and a second pin extending downwards away from the main body; and a second base portion coupled to the first base portion, the second base portion comprises a first aperture and a second aperture, wherein the first aperture is positioned to receive the first pin and the second aperture is positioned to receive the second pin during assembly of the first base portion to the second base portion, wherein the first pin is positioned proximate a first base front portion and the second pin is positioned proximate a first base back portion.

10. The stand mixer of claim 9, wherein at least one of the first aperture and the second aperture is a slot configured to restrain rotation of the first base portion and the main body relative to the base in a horizontal plane.

11. The stand mixer of claim 9, wherein at least one of the first pin and the second pin of the first base portion engaging in the respective first aperture or the second aperture of the second base portion restrains rotation and translation of the first base portion and the main body relative to the second base portion in a horizontal plane.

12. The stand mixer of claim 9, further comprising a plurality of clearance holes on the second base portion and a plurality of fastener holes on the first base portion.

13. The stand mixer of claim 12, wherein the first pin and the second pin of the first base portion engaging with the respective first aperture or the second aperture of the second base portion aligns the plurality of clearance holes with the plurality of fastener holes.

14. The stand mixer of claim 9, further comprising a third pin extending from the first base portion and the second base portion comprises a third aperture, wherein both of the second pin and the third pin are positioned proximate the first base back portion and are spaced across opposing sides of the first base portion with respect to a pair of first base side portions.

15. The stand mixer of claim 14, wherein the third aperture comprises a clearance slot, wherein the third pin engaging within the third aperture defines a gap between the third aperture and the third pin while assembled.

16. A stand mixer appliance, comprising:

a casing that comprises a second base portion, a main body mounted to the second base portion, and a motor housing mounted to the main body and extending outwardly above the second base portion; and a plurality of clearance holes on the second base portion, the second base portion comprises a first aperture and a second aperture, wherein the main body comprises a column portion and a first base portion, the first base portion extending outwardly away from the column portion, the first base portion comprising a first pin and a second pin extending downwards away from the main body and a plurality of fastener holes, wherein the first aperture is positioned to receive the first pin and the second aperture is positioned to receive the second pin during assembly of the first base portion to the second base portion, wherein the first pin is positioned proximate a first base front portion and the second pin is positioned proximate a first base back portion, wherein the first pin and the second pin of the first base portion engaging with the respective first aperture or the second aperture of the second base portion aligns the plurality of clearance holes with the plurality of fastener holes, and wherein a third pin extends from the first base portion, and the second base portion comprises a third aperture, wherein both of the second pin and the third pin are positioned proximate the first base back portion and are spaced across opposing sides of the first base portion with respect to a pair of first base side portions.

17. The stand mixer of claim 16, wherein at least one of the first aperture and the second aperture is a slot configured to restrain rotation of the first base portion and the main body relative to the base in a horizontal plane.

18. The stand mixer of claim 16, wherein at least one of the first pin and the second pin of the first base portion engaging in the respective first aperture or the second aperture of the second base portion restrains rotation and translation of the first base portion and the main body relative to the second base portion in a horizontal plane.

19. The stand mixer of claim 16, wherein the third aperture comprises a clearance slot, wherein the third pin engaging within the third aperture defines a gap between the third aperture and the third pin while assembled.

* * * * *